F. G. WARD.
TREAD FOR PNEUMATIC TIRES.
APPLICATION FILED APR. 19, 1907.

1,021,171.  Patented Mar. 26, 1912.

WITNESSES:
E. F. Stewart
Herbert D. Lawson

Frederick G. Ward,
INVENTOR.

By C. A. Snow & Co.
ATTORNEYS

UNITED STATES PATENT OFFICE.

FREDERICK G. WARD, OF PITTSBURGH, PENNSYLVANIA, ASSIGNOR OF ONE-THIRD TO HARRY DAVIS, OF PITTSBURGH, PENNSYLVANIA.

TREAD FOR PNEUMATIC TIRES.

1,021,171.   Specification of Letters Patent.   Patented Mar. 26, 1912.

Application filed April 19, 1907. Serial No. 369,140.

*To all whom it may concern:*

Be it known that I, FREDERICK G. WARD, a citizen of the United States, residing at Pittsburgh, in the county of Allegheny and State of Pennsylvania, have invented a new and useful Tread for Pneumatic Tires, of which the following is a specification.

This invention relates to improvements in pneumatic tires and more particularly to treads therefor designed to be formed with the tire or to be connected thereto subsequent to the formation thereof.

The object of the invention is to provide a tread designed for use upon heavy automobile tires and whereby skidding is prevented when the vehicle is rounding curves.

A still further object is to provide a tread of this character utilizing wire coils, portions of which are exposed through the surface of the tread, said coils being interwoven so as to prevent any of the wires from being stripped from the tire should it become caught in an object upon the road.

With these and other objects in view the invention consists of certain novel features of construction and combinations of parts which will be hereinafter more fully described and pointed out in the claims.

In the accompanying drawings is shown the preferred form of the invention.

Figure 1:
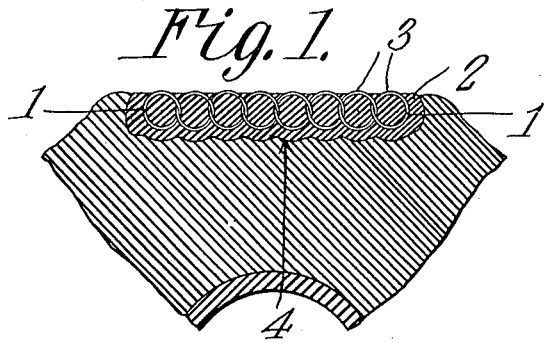
Figure 2:
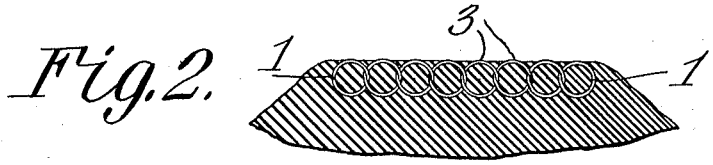
Figure 3:
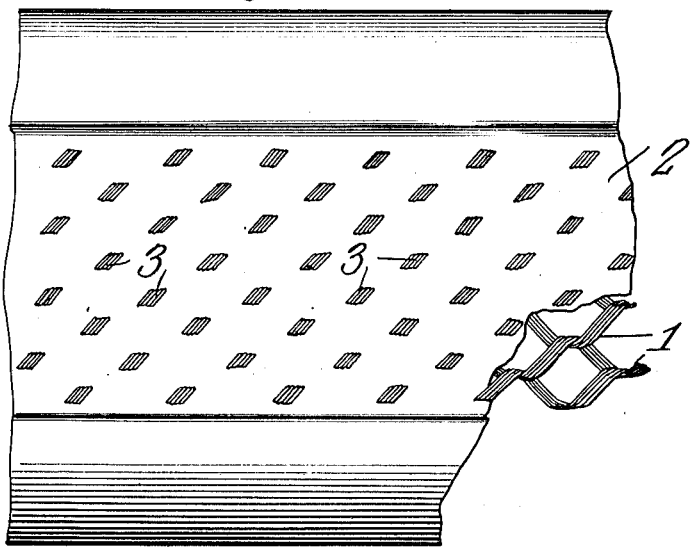
Figure 4:
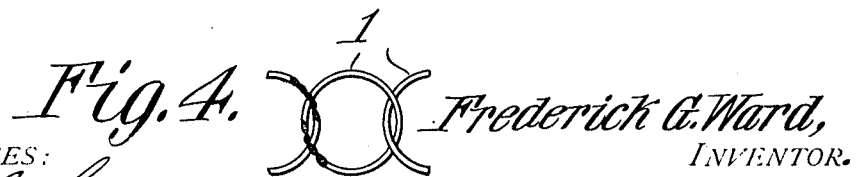

In said drawings: Figure 1 is a transverse section through a portion of the tire and showing a tread thereon constructed in accordance with the present invention; Fig. 2 is a similar view showing the tread formed with the tire; Fig. 3 is a plan view of a portion of a tire showing a modified form of the tread applied thereto; and Fig. 4 is an enlarged section through a portion of the coils of the tread.

Referring to the figures by characters of reference, 1, 1 designate parallel interwoven series of spring wires, each series consisting preferably of four similar wires coiled together. These coils are interwoven throughout their lengths and extend around the length of the entire tread which is made up, in addition to the wire coils 1, of a high grade of rubber 2 which completely fills the coils 1 and incloses all portions of the coils except the outermost portion of each whirl thereof. These exposed portions appear upon the face of the tread at regular intervals as shown at 3 in Fig. 3.

The tread is designed to be constructed as an article of manufacture in the form of an elongated strip of sufficient size to surround a tire and where it is to be used in this manner it is cemented or otherwise secured within an annular recess or groove 4 formed in the outer face of the tire as shown in Fig. 1. If preferred, however, this improved tread can be formed within the tire while said tire is being manufactured simply by embedding the wire mesh made up of the interlocked coils 1 so that only the outer portion of each coil will be exposed upon the outer face of the tread. This construction has been illustrated in Fig. 2. Whether or not the tread be formed with the tire or is applied thereto subsequent to the construction of the tire the advantages derived therefrom are the same. By utilizing coils having exposed portions the tire is prevented from skidding when rounding curves and by having interlocked coils it becomes impossible to strip a wire from the tire should the exposed portion thereof become entangled in any nonyielding object upon the road bed. The wire would break instead of becoming stripped from the tread as would be the case if the coils were not interlocked. Where the tread is prepared as an article of manufacture it can be used for repairing worn tire treads.

In order that the coils may be prevented from shifting their relative positions within the rubber and cutting it, it is designed to immerse the interlocked wires in a molten metal which, when cooled, will bind the whirls together. This metal may be an alloy of such a nature as to permit the rubber to be vulcanized thereto.

What is claimed is:

1. A tire of resilient material having embedded in the tread portion thereof a plurality of helices so disposed that portions thereof are flush with the road-engaging surface of the tire.

2. A tire of resilient material having embedded in the tread portion thereof a plurality of metallic helices having portions thereof flush with the road-engaging surface of the tire and having their axes disposed in planes parallel to the road-engaging face of the tire.

3. A tire of resilient material having embedded in the tread portion thereof a metallic helix having portions thereof flush with the road-engaging surface of the tire and being disposed circumferentially of the tire.

4. A tire of resilient material having embedded in the resilient material thereof a structure comprising a plurality of layers of metallic coils, portions of the bent rods or wires of the outer layer being flush with the road-engaging surface of the tire.

5. A tire of resilient material provided in its tread with a plurality of interlaced helices embedded in the resilient material and having portions of each helix flush with the road-engaging surface of the tire.

6. A tire having a tread made up of annularly disposed coils embedded within the tire, portions of each coil being exposed upon the tread.

7. A tire having interwoven metal coils embedded in the tread thereof, a portion of each whirl of the coils being exposed upon the tread.

8. A tread for tires comprising a plurality of coils disposed longitudinally of the tire and a rubber filling and covering therefor, said coils being exposed through the outer face of the covering.

9. A tread for tires consisting of interwoven metal coils disposed longitudinally of the tire and a rubber covering and filling therefor, portions of the coils being exposed through the outer face of the covering.

10. A tire tread, a substantially continuous elastic member embedded therein and coiled in the direction of the circumference, and having portions of its coil exposed upon the tread.

11. A tire tread, a plurality of laterally interlocked elastic members embedded in the tread and coiled in the direction of the circumference, portions of the coils being exposed upon the tread.

In testimony that I claim the foregoing as my own, I have hereto affixed my signature in the presence of two witnesses.

FREDERICK G. WARD.

Witnesses:
C. E. FARRINGTON,
H. W. DUBBS.